United States Patent [19]
Kolakowski et al.

[11] 3,837,771
[45] Sept. 24, 1974

[54] APPARATUS FOR PRODUCING FOAMED RESIN-CARE WEB-FACED LAMINATES IN CONTINUOUS LENGTHS

[75] Inventors: Richard A. Kolakowski, Northford, Conn.; Robin L. Grieve, Delfzijl, Netherlands; Peter J. Tilgner, Akron, Ohio

[73] Assignee: The Upjohn Company, Kalamazoo, Mich.

[22] Filed: Nov. 17, 1972

[21] Appl. No.: 307,441

[52] U.S. Cl.............. 425/110, 425/115, 425/145, 425/374, 425/817 C
[51] Int. Cl.............................................. B29d 27/04
[58] Field of Search ...... 264/47; 425/4 C, 112, 122, 425/145, 130, 374, 375, 817 C, 115, 110; 164/86

[56] References Cited
UNITED STATES PATENTS

| | | | |
|---|---|---|---|
| 1,751,049 | 3/1930 | Miller | 425/375 X |
| 2,742,000 | 4/1956 | Hansen et al. | 425/375 |
| 3,257,483 | 6/1966 | Eberle | 425/817 C X |
| 3,429,956 | 2/1966 | Porter | 425/4 C X |
| 3,475,522 | 11/1969 | Garibian et al. | 425/4 C X |
| 3,551,945 | 1/1971 | Eyberg et al. | 425/130 X |

Primary Examiner—R. Spencer Annear
Assistant Examiner—Mark Rosenbaum
Attorney, Agent, or Firm—Steward & Steward

[57] ABSTRACT

Apparatus is disclosed for continuously producing foamed resin-core web-faced laminates useful as insulating and construction panels or the like, in which provision is made to simplify and improve adaptation of the apparatus for more practical, commercial production of panels of widely varying thickness specifications, while maintaining uniformity of foam density and cell size regardless of panel thickness. Self-foaming resin mix is applied to a pair of continuously advancing facing webs and allowed to expand between them to form the laminate or foam board. Provision is made for changing the point of lay-down of the resin mix on the facing web in relation to the point of entry of the webs to a curing zone. Where the resin is applied in the form of a liquid stream, provision is made for adjusting the position of a nip roll relative to the curing zone entrance and/or point of lay down, the facing webs being passed through an adjustably restricted gap formed by the nip roll after the lay-down of resin mix to effect more even distribution and adherence of the resin to the webs. A modification is also disclosed employing spray application of the resin. The disclosure also covers the method of continuously producing foam board using the apparatus.

7 Claims, 10 Drawing Figures

APPARATUS FOR PRODUCING FOAMED RESIN-CARE WEB-FACED LAMINATES IN CONTINUOUS LENGTHS

BACKGROUND OF THE INVENTION

This invention relates to the manufacture of foamed resin-core web-faced laminates, and more particularly to commerically practical continuous production of such laminates for use as structural and/or insulating panels in building construction.

Many proposals have been made for the continuous production of construction paneling or wallboard composed of a foamed thermoset resin core surfaced on at least one but usually on both sides with relatively thin sheets of facing material to protect against excessive abrasion. The method of producing such sandwich structures generally involves feeding two continuous webs of sheet material from supply rolls thereof, passing these webs through a series of operating stations disposed along a conveyor run, which serves to advance the web material from its source to a point of delivery of the finished sandwich structure. In the course of travel, self-foaming, catalyzed polymerizable liquid resin mix is applied to one or both of the webs, and they are then caused to converge into parallel relation with the resin mix sandwiched between them. Provision is made for controlling the distribution of the resin mix and causing it to adhere to the webs to produce an integrated, laminated composite which is finally cured or set, as by the application of heat or the lapse of time, or both.

The basic concept of producing such sandwich structures continuously is simple; however, the implementation of the concept into a commercially practical embodiment is not so simple. The reason of course is that there are many conflicting requirements in respect to resin compositions and facing materials, and differing physical and performance specifications for the starting materials as well as the finished product, in addition to changing conditions encountered in the course of manufacturing operations, all of which must be very carefully coordinated. To mention some of the problems, it is well known that once the liquid components of a self-foaming catalyzed thermosetting resin mix are brought together, irreversible reaction begins to occur immediately to produce an expanding foam which rises at different rates or in stages, and rigidifies in varying degree of hardness, flexibility, etc., depending on the particular polymer employed. Polyurethane and phenol formaldehyde polymers are common types, but there are many others. With such materials the timing of the deposit or lay-down of the resin mix on the facing web is critical in relation to other, subsequent, operations involved in the forming of the laminate. Further, since the finished product must meet certain physical and thermal specifications, the amount of resin mix applied to the web must not only be done in an exceptionally uniform manner across a surface which is usually quite wide, as in the case of wallboard or roofing panels, but must also be applied in carefully controlled amount. That is, the amount of resin mix applied per unit area of web will in large measure determine the final thickness of the core, and hence the thickness of the finished product. This problem arises unless positive restraining means are applied to opposite faces of the web during some part of the rise and curing phases, in order to force it to stay within permissible tolerances of final thickness variation. But application of such positive restraining means, which can be done by either stationary or movable plattens held against the opposite faces of the sandwich, requires heavy and expensive equipment to withstand the loads developed over the large areas involved. Further, such externally applied pressures will disrupt or modify the normal "rise profile" of the resin mix and change the size of the foam cells produced, resulting in a non-uniform cellular structure or density in any given transverse section of the finished product. This is commonly referred to as "packing" which, of course, not only increases the weight of the finished product but also changes other physical characteristics. Other factors which complicate the manufacturing process include ambient temperature variations which affect the rise profile; the particular nature of the resin mix itself; and the speed or rate of travel of the conveyor means. Some or all of these problems have been dealt with in arrangements previously developed for producing web-faced foam board of the type under consideration.

For example, U.S. Pat. Nos. 3,215,581, 3,551,945 and 3,574,802 propose coordinating the resin mix feed rate in conjunction with the gap at the nip roll, and the rate of travel of the board through a cure zone. The arrangement is satisfactory for the production of foam board of the one given thickness for which the apparatus is specifically designed, using a particular resin mix composition. But considerable difficulty is encountered if different resin mix compositions are used at various times, and especially if it is desired to produce laminates of one thickness during one operational run, and then change quickly to a substantially different thickness in a subsequent operational run. Another proposal is disclosed in U.S. Pat. No. 3,240,846 wherein there is employed a succession of yielding pressure plates in the rise zone following lay down of the resin mix on one of the webs facing, the purpose of such pressure plates being to adapt the apparatus and process to accept different resin mixes, yet avoid excessive crushing or packing of the foam due to different rise profile characteristics. The controllable parameters of this equipment are the rate of feed of resin mix and the pressure of the restraining plates in the rise zone. Packing of the foam is unavoidable in this arrangement. U.S. Pat. No. 3,417,168 describes apparatus employing a series of successive conveyor sections having sensors for noting pressure change in the various sections, in order to induce suitable signal pulses for controlling the resin laydown rate and/or the conveyor speed. U.S. Pat. No. 3,453,168 introduces the concept of controlling the heating and cooling of the facing webs and resin mix in the course of their advance through the processing stations, and using air jets to help obtain uniform distribution of the resin mix on the webs and to shape the rising foam.

These patents are typical of prior attempts to solve the many detailed problems that arise in commercial or industrial production of foam board. Such proposals do of course provide some degree of flexibility to accommodate desired changes in the product, but there are limits to which changes in them can be made, or at least the ease with which they can be made, which greatly affect the economics of their operation under any condition which varies appreciably from an optimum for which the particular apparatus was specifically designed.

SUMMARY OF THE INVENTION

It is a principal purpose of the present invention therefore to provide apparatus having greater flexibility of control and adaptability for producing foam board to different thickness specifications, and ability to accept different resin mixes having different rise profiles. Apparatus of the present invention, and the method involved in operation of such apparatus, incorporates such previously proposed arrangements as means for varying the nip roll gap and rate of lay down of resin mix; but in addition the present invention introduces a unique combination of features characterized by provision for longitudinally shifting, relative to the direction of web travel, the lay-down point of the resin mix relative to the point of entrance of the developing sandwich or laminate to the curing zone; and likewise for longitudinal adjustment of the location of a nip roll intermediate the resin mix lay-down point and the entrance to the cure zone.

The arrangement here disclosed also provides more accurate means of coordinating the particular and inherent rise profile characteristics of any given foam mix with the physical specifications required in the resulting product; i.e., the total thickness of the resulting foam board, and its density. The arrangement described makes is possible to substantially reduce and sometimes completely eliminate need for application of external restraints, such as pressure plates, to the opposed surfaces of the developing foam board, preliminary to and during the early stages of curing, with a consequent improvement in uniformity of cell size and distribution in the resulting foam core. The arrangement provides substantially greater flexibility which enables the apparatus here disclosed to be practically useful for production of foam boards of considerable range of thickness, for example about ¼ inch to as much as several inches. It further facilitates adjustments in the apparatus to accommodate variations in ambient temperature, or to correct out-of-tolerance thickness deviation. By reason of reduced need for imposing physical restraints in the apparatus to maintain dimensional tolerance of the finished product, substantial simplification of the apparatus needed for the production of foam board is made possible.

The invention is illustrated with reference to the apparatus shown in the accompanying drawings, in which.

DESCRIPTION OF PREFERRED EMBODIMENT

By way of general introduction, the apparatus for continuous production of foam board described in more detail hereinafter comprises an elongated conveyor run composed of several sections arranged in end-to-end alignment, with complementary processing equipment disposed along the run. Such latter equipment comprises means for feeding a pair of facing webs at the starting end of the run, means for mixing and distributing a liquid resin mix between the facing webs as these are advanced, a nip forming means through which the webs are passed to gage the initial thickness of the web-resin sandwich and further the uniform distribution of resin across the width of the web; a curing oven through which the substantially fully developed foam board passes to accelerate the polymerization reaction and effect a permanent setting of the developed foam; and finally means for receiving the continuously produced foam board, trimming its side edges to proper standard panel width and cutting it transversely into standard modular lengths to provide individual finished panels. Additional supporting equipment is required to deliver, meter and premix the components required to make up the necessary resin mix for delivery to the mixing head, means for heating the cure oven, and the associated controls necessary for coordinating the speed of travel of the facing webs, the rate of delivery of resin mix, and temperature of the cure oven.

Figure 6:
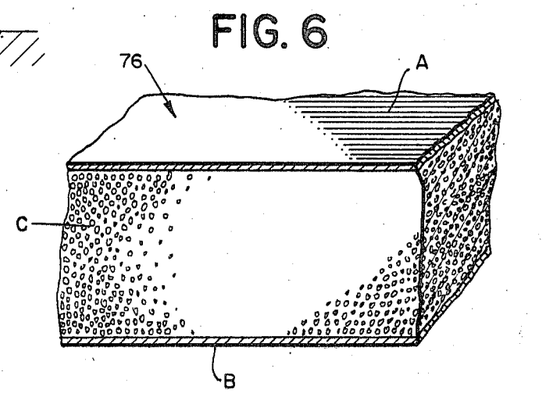
FIG. 6 is a fragmentary perspective view of foam board produced by the apparatus.

The typical end product obtained from the apparatus hereinafter described is illustrated in FIG. 6 which shows a small portion of foam board comprising a laminate of facing sheets A and B, which may be identical or different, bonded to an expanded resin core C. As will appear hereinafter, the bonding is inherently effected during development of the finished product.

Figure 1A:
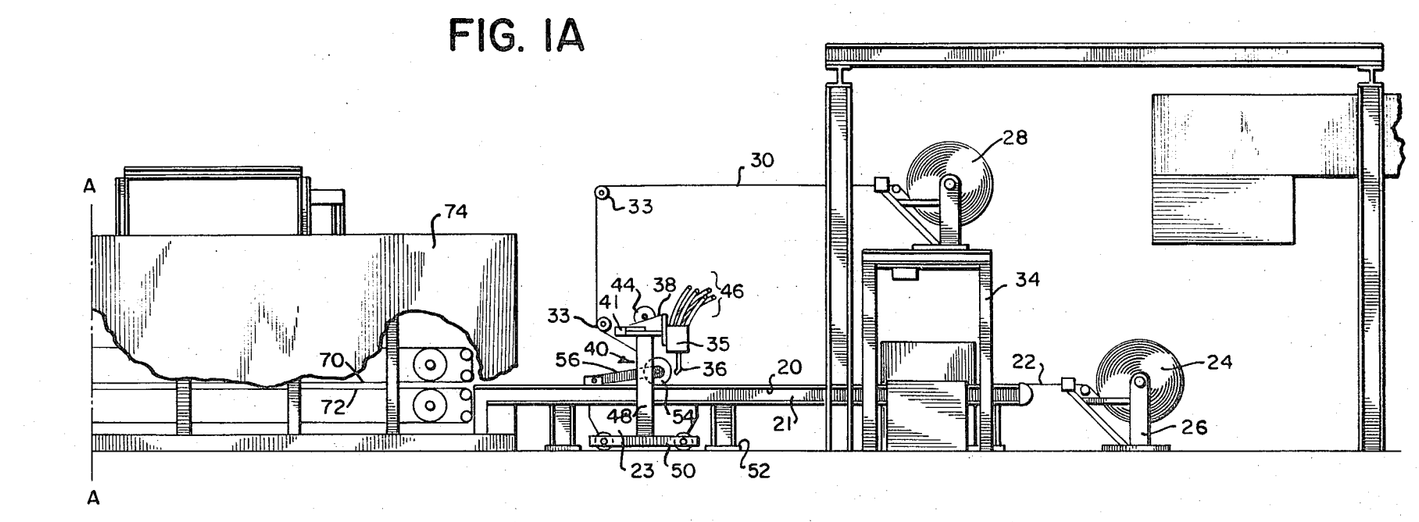
FIGS. 1A and 1B are endwise-related views in side elevation, largely schematic, of a foam board production line incorporating the invention concept.
Figure 1B:
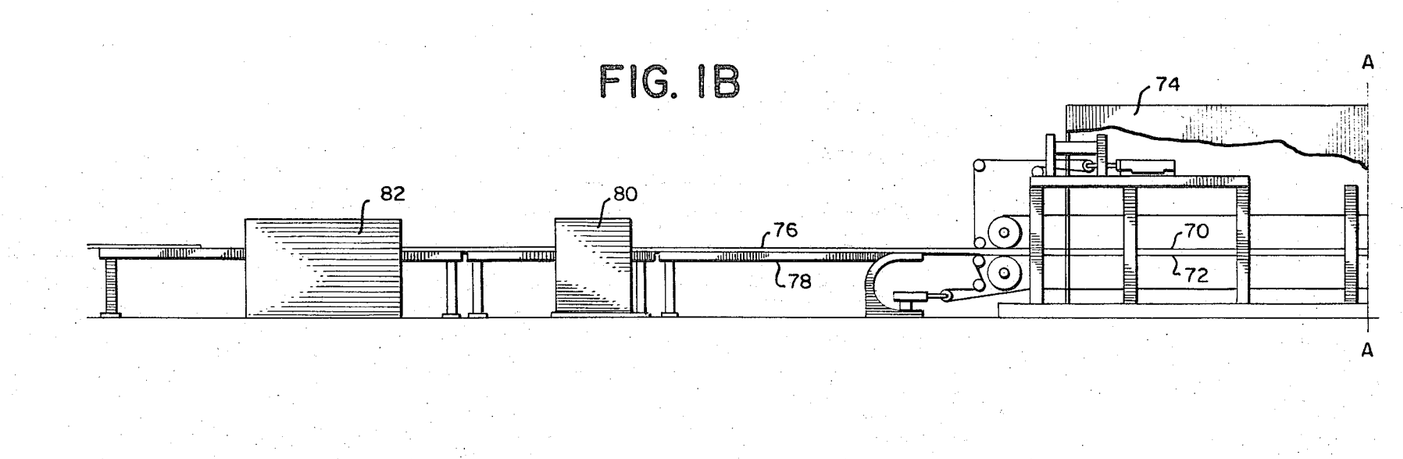
Figure 2A:
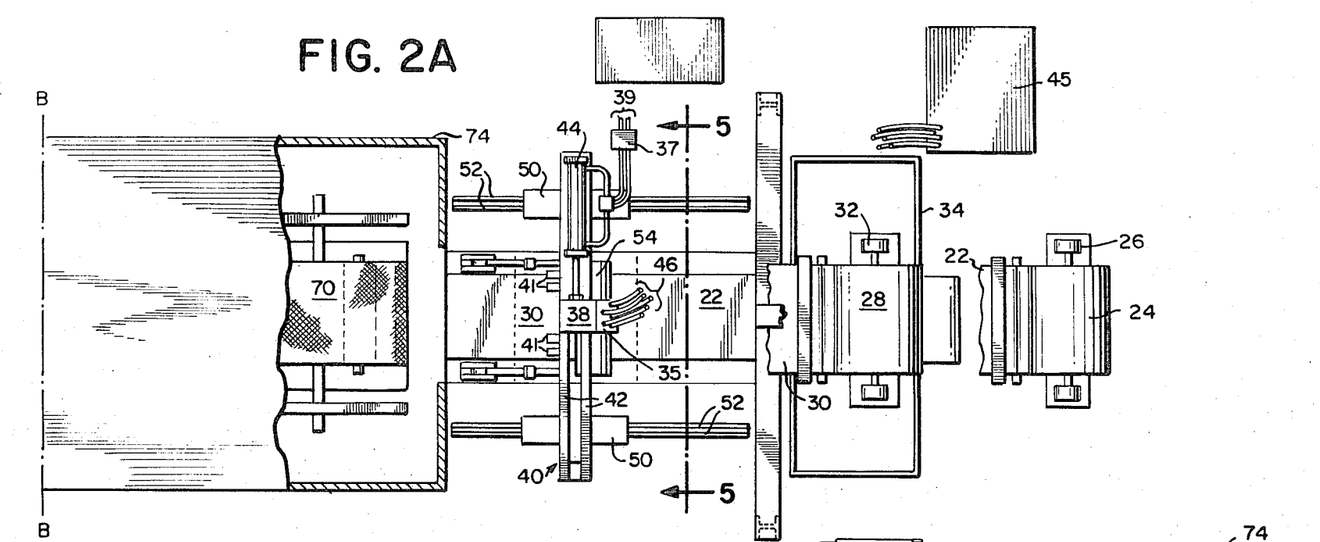
FIGS. 2A and 2B are endwise-related top plan views of the production line seen in FIG. 1.
Figure 2B:
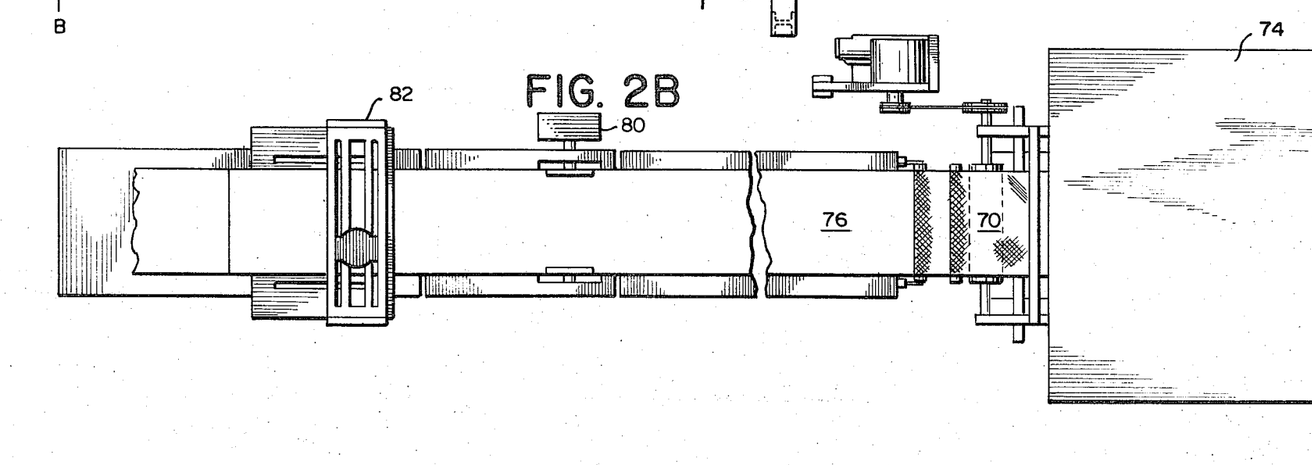
Figure 3:
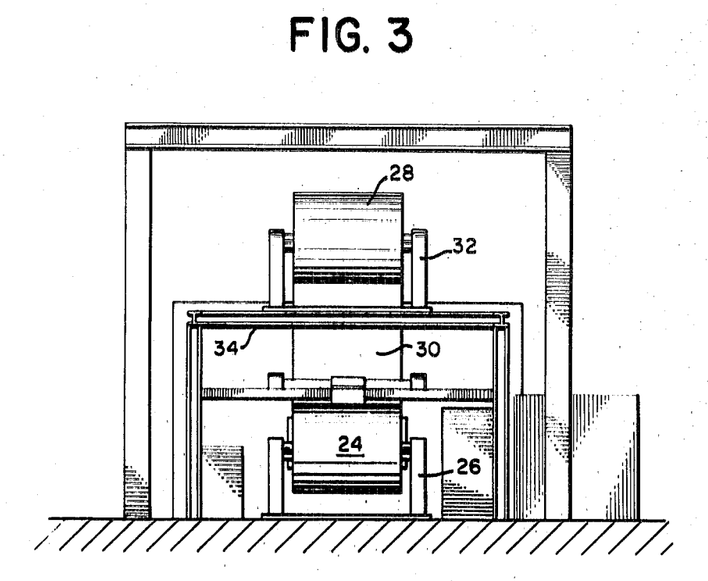
FIG. 3 is an end view of the production line looking from the right in FIG. 1.

Turning now to the apparatus and with reference more particularly to FIGS. 1 and 2, the start or right hand end of the conveyor run as seen here includes means for handling the feed of facing webs from rolls in which it is supplied. This comprises a smooth-topped platform or bed 20 supported upon a frame 21 and along which a lower web 22 is advanced, in this instance from roll 24 suitably supported in a cradle 26. Preferably bed 20 is made foraminous in the area immediately preceeding and following the resin lay-down point and nip roll. A housing 23 fastened below this foraminous area forms a vacuum chamber which is connected to a source of vacuum, not shown, to force web 22 to lie flat against the surface of the bed as it advances over the area under consideration. Wrinkling or humping of the web in this region would cause improper distribution of resin mix, resulting in thickness variation in the finished panel.

Another roll 28 supplying the upper web 30 is carried by a cradle 32 supported upon a bridge 34 extending above and across bed 20. Web 30 is fed over a series of idler rolls 33 to meet lower web 22, as will be described presently.

A liquid self-foaming resin mix is poured onto the upper surface of lower facing web 22 as this is advanced along bed 20 to a nip roll and curing oven. The point of application of resin, relative to the location of the nip roll and oven, is of paramount importance to successful operation of the apparatus, as is uniformity of distribution of the resin across the width of the web 22. In the arrangement specifically illustrated in FIGS. 1–5, the resin components are supplied by flexible ducts from storage tanks and metering pumps to a mixing head 35 equipped with a pour spout or nozzle 36. The mixing head is mounted on a reciprocating carriage 38 supported by pour bridge 40 straddling bed 20 and web 22. A generally sinusoidal path of liquid resin lay-down on web 22 is produced by reciprocating carriage 38 back and forth on pour bridge 40 as web 22 is advanced beneath it. Tracks 42 (FIG. 2A) on the pour bridge support head 35, and the latter is reciprocated on these tracks by hydraulic ram 44 in timed relation to the forward travel of web 22.

Liquid resin components are separately stored, pumped and metered by conventional equipment designated generally at 45 in FIG. 2A to feed through flexible conduits 46 connected to mixing head 35. At the mixing head, the several components are mixed and then applied immediately to the facing web by the pour spout.

To permit adjustment of the point of lay-down of the resin mix relative to the previously mentioned curing oven, pour bridge 40 is supported by uprights 48 at each side of bed 20, and these uprights in turn are mounted on a trolley 50 which is guided for longitudinal travel on floor tracks 52. Thus the whole bridge assembly can be moved selectively toward or away from the cure zone, and provision is made (not shown) for locking trolley 50 in any particularly selected position.

Immediately downstream of the lay-down point, in the direction of web travel, upper web 30 is brought into contact with the resin-coated surface of lower web 22. As herein illustrated, this is effected by passing upper web 30 over a carefully machined nip roll 54 suitably journaled on a shaft 55 supported at opposite sides of bed 20. Nip roll 54 serves to produce contact of upper web 30 with the resin coat on the lower web, to wet the under surface of the upper web and promote good adhesion of it to the finally developed foam core. The nip or gap formed between roll 54 and the adjacent reinforced section of bed 20 is accurately adjustable, by means presently to be described, so as to insure this contact and cause uniform distribution of the resin, as well as uniform metering of the amount retained, as the webs advance beyond this point. That is, as the webs are brought into closely spaced adjacency at nip roll 54, the liquid resin, previously deposited in the aforesaid sinusoidal path along the web axis, is trapped in the nip and is squeegeed laterally along the roll to form a continuous rolling bead or filet between the webs at the conjunction of the roll and bed surfaces, extending across the entire width of the webs.

Metering of the amount of resin retained in the resulting sandwich or laminate of upper and lower webs 30 and 22 after passing the nip roll is thus controllable by adjusting the spacing of roll 54 from bed 20 to change the nip gap. This is turn provides a precise control of the final thickness in the resulting foam board, assuming the resin is allowed to expand thereafter substantially freely to develope its natural rise profile.

Thus nip roll 54 serves in this embodiment as a means for bringing webs 22 and 30 into spaced conjunction, and for distributing the resin across the surfaces of the webs, as well as performing a final metering operation, supplementing the initial rough metering afforded by pour spout 36.

Figure 4:
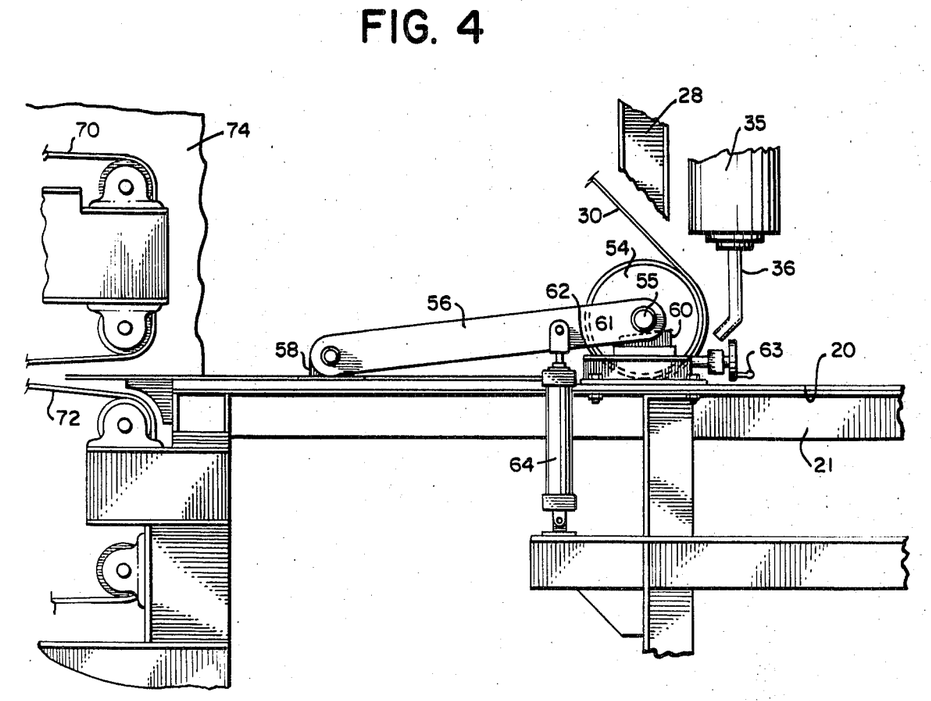
FIG. 4 is a detailed side elevational view of parts of the apparatus, on an enlarged scale relative to FIG. 1.
Figure 5:
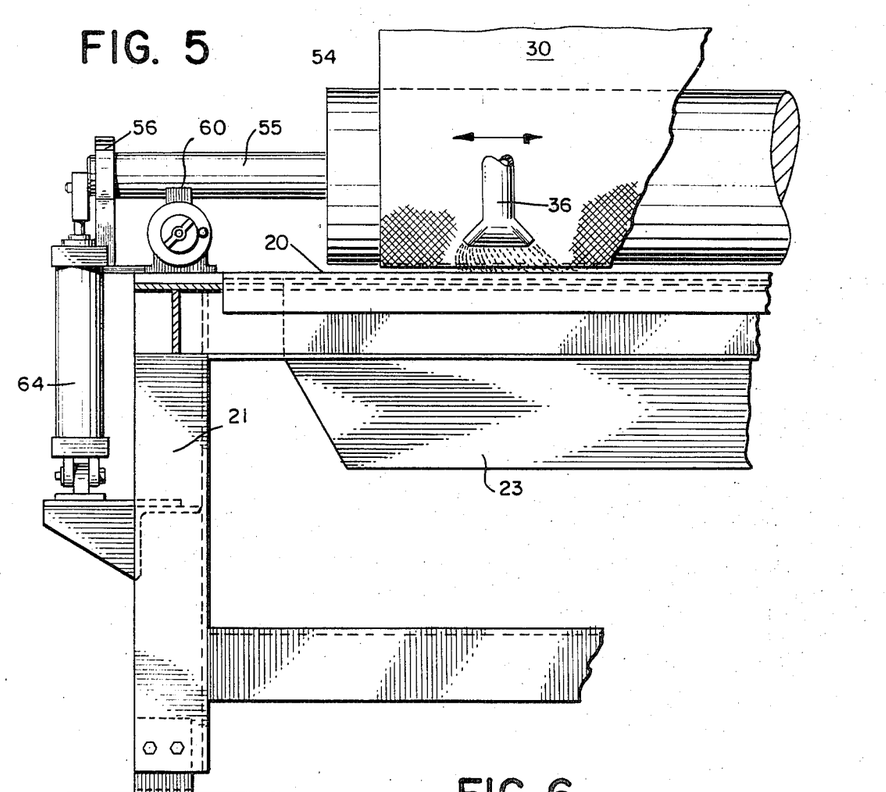
FIG. 5 is a partial end view in elevation on line 5—5 of FIG. 2A.

In order to provide for precise adjustment of the nip gap, shaft 55 of roll 54 is supported at each of its ends by an arm 56, as best seen in FIGS. 4 and 5. Each arm is pivotally mounted on a block 58 secured to frame 21 at the side of bed 20 to extend longitudinally thereof, and provision is made for clamping or bolting the block in selected position to fix shaft 55 and nip roll 54 in desired spaced relation to the entrance of the cure zone. Pivot arms 56 maintain nip roll 54 against longitudinal movement but permit vertical adjustment relative to bed 20. Such adjustment is effected by shifting a pair of wedge blocks 60, located one each under the projecting ends of shaft 55. For this purpose, each wedge block is carried by a slide 61 which is longitudinally shiftable on ways 62 by means of a feed screw 63. Ways 62 are bolted or otherwise suitably fastened to frame 21 at each side of bed 20 parallel to blocks 58. By turning screws 63, the respective wedge blocks 60 are moved forward or aft to raise or lower shaft 55 and nip roll 54. The arrangmeent provides precise control of the nip gap, which is essential in obtaining accurate final thickness of the foam board.

For convenience in start-up operation, a hydraulic actuator jack 64 is connected between each arm 56 and a bracket on frame 21 at each side of bed 20 to effect powered lifting of the nip roll. This facilitates feeding of the forward end of webs 22 and 30 beneath the roll and over the extension or terminal portion of bed 20, that is the portion over which the incipient foam board travels after leaving the nip roll, preliminary to arriving at the conveyor which draws the partially cured board through the curing oven. This terminal portion of bed 20 serves as a transition section on which the developing foam board is supported during the creaming and rise stages of the resin mix. It is during the period of travel along this section that the foam expansion causes gradual separation of the facing webs to develop the final desired board thickness. The "rise profile" spoken of hereinabove is the configuration of the thickness of the resin core, at successive points along this terminal section of bed 20, as the board moves through this transition stage. That is, it is the profile of the thickness of the foam from the time that the initial fluid mix is laid down by the mixing head and nipped by the nip roll, and the ultimate developed total thickness of the foam at such subsequent point in the forward travel of the laminate where expansion has been substantially completed to produce a self-sustaining core.

It will be apparent that if the flow rate of liquid resin from spout 36 is held constant during traverse of mixing head 35, and the rate of traverse of mixing head 35 is also held constant, a greater amount of resin lay-down will occur adjacent the margins of the web in a given increment of web travel than occurs at points nearer the longitudinal center of the web. This is due to the doubling back upon itself of the resin stream adjacent web margins. However there occurs simultaneously a longer gap between one loop of the resin stream and the next succeeding such loop than exists between the stream at longitudinally corresponding points nearer the center of the web. It is accordingly a feature of this invention to produce a variable lay-down of liquid resin during the mixing head traverse cycle and this is effectively obtained by changing the reciprocation speed of head 35 during the cycle. This is done by automatically introducing a metering restriction in the hydraulic supply system feeding ram 44 at selected positions of head 35 during its traverse cycle. For this purpose, a solenoid controlled valve 37 is placed in the hydraulic supply line 39 to the actuator, and this valve is provided with one or more restrictor means operably connected to limit or trip switches 41 adjustably preset along tracks 42 of the pour bridge to be contacted by the reciprocating carrier 38 supporting mixing head 35. The presently preferred arrangement is set to automatically actuate the restrictor means of valve 37 to introduce a metering restriction in that portion of the travel of pour spout 36 to slow it down as it approaches the side margins of web 22, causing a momentary dwell at the edge, and to remove such restriction at the point of reversal of traverse direction to accelerate the traverse rate to maximum again as mixing head leaves the margin. By this means a flexibility of adjustment is provided for the traverse to obtain variations in resin lay-down profile at constant through-put.

Following transition of the developing form board through the rise zone constituting the terminal portion of bed 20 as described above, the board is received by a conveyor composed of a pair of endless belts 70, 72 disposed in opposed upper and lower horizontal runs. Conveyors 70, 72 are driven by a motor (not shown) to advance the foam board by contact with its opposite faces. Since the foam board is not completely rigidified upon entering into engagement with conveyors 70, 72 upon leaving the terminal portion of bed 20, the surface pressure applied by the conveyors is preferably made adjustable throughout their travel. This arrangement makes it possible to apply maximum pressure for gripping and advancing the foam board near the end of conveyor travel, where the board will have become substantially fully cured, and to minimize contact pressure at the forward end where the board is not fully cured.

To expedite the cure, conveyors 70, 72 pass through an oven 74 which supplies heat to accelerate the polymerization of the foamed resin to fully rigidify the core and produce a firm bond to the web facings. The fully cured, rigidified laminate 76 is pushed out of oven 74 by the conveyor and thus pulls the facing webs from their respective supply rolls, through the resin laydown, nip roll and rise stations.

As the fully developed foam board emerges from conveyors 70, 72, it is pushed onto idler conveyor 78 and passes through a side trimming station 80 where rotary saws cut the foam board to standard width. Next the board is passed through a flying cut-off saw station 82 where the board is cut to standard panel lengths.

The optimum condition of operation of the apparatus is that in which minimum restraints are applied to the surfaces of the incipient foam board during the rise and initial cure stages. In other words, the conditions of operation are set to effect a condition such that the natural, unrestrained rise of the resin mix to produce the foam core will arrive at and maintain a uniform finished thickness of the foam board, without the need for applying pressure to the surfaces of the board to force it to conform to dimensional specifications. Such an optimum condition of operation has been difficult if not impossible to achieve practically heretofore, except possibly where the apparatus was specifically engineered for one particular resin mix and a fixed board thickness. The attainment of this objective of producing a foam board of desired dimension with minimum use of restraining means, while simultaneously affording a commercially practical capability for producing boards of different thicknesses and using different resin compositions, is greatly facilitated by the provision of the means hereinabove disclosed for adjusting the longitudinal position of the resin laydown point, relative to the entry of the developing board into the curing oven, in combination with nip roll adjustment, both longitudinally and vertically, and mixing head traverse rate profile. By this arrangement, practical controls are afforded which permit an operator to better adapt the apparatus to the particular rise profile of the resin mix employed, such that by controling the amount of resin applied to the facing webs and gaging the initial spacing of the webs by the nip roll, the desired final board thickness can be attained with minimum use of pressure restraints on the developing board. Thus, changing the operation from production of a board of one thickness to that of a different thickness, or the substitution of different resin mixes, can be readily accomplished in a commercially practical manner.

The liquid stream method of applying the resin mix to the facing sheets, as described in the foregoing embodiment, is subject to an inherent limitation as to the maximum speed of traverse of the mixing head, because the momentum of the solid liquid stream causes it to be thrown out laterally at the point of traverse direction reversal at high traverse rates. Therefore, with that method of application, the nip roll is relied upon to do much of the spreading of resin transversely of the web, and the resin mix must be one which has a polymerization rate which allows the nip roll to spread the mix before creaming occurs. The above-described method of resin application is also not well suited to production of laminates where rough or corrugated facing sheets are employed.

Accordingly an alternative method of applying the resin mix is resorted to, wherein the mix is deposited on the facing sheet in the form of a spray. Because the spray particles are light, the momentum problem of the liquid stream is avoided. The mix used here can also incorporate more catalyst, shortening up reaction time, and this is good for use with the rougher types of facing sheet materials.

In a modified form of apparatus useful for spray application, the pour bridge and reciprocating carriage of the previous embodiment are retained, but a spray head and nozzle are substituted for the corresponding mixing head and pour spout, and a different form of nip forming arrangement is employed.

Reciprocation of the spray head is accomplished as before, but the spray nozzle distributes the resin in a cone or fan-shaped pattern, and the material is caused to overlap itself marginally in the lay-down to get uniform distribution. Accordingly, with this spray method of application, a somewhat different means than the nip roll is utilized for smoothing out the distribution of resin and for effecting contact with the upper web and the wetting of it at the point of conjunction. Such an arrangement is shown more particularly in FIGS. 7 and 8.

Figure 7:
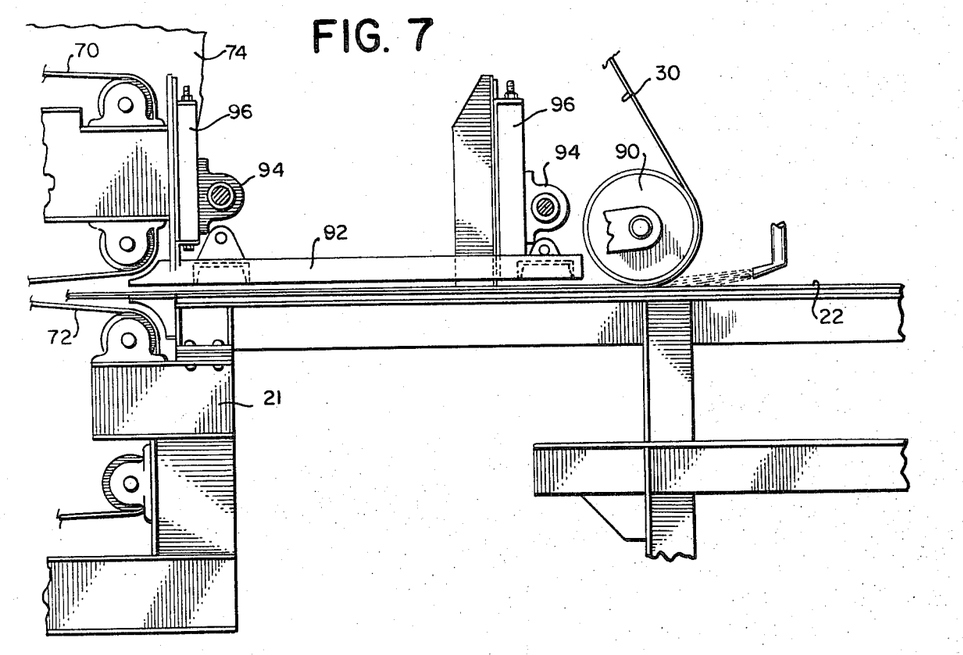
FIG. 7 is a view similar to that of FIG. 4 but showing a modification.
Figure 8:
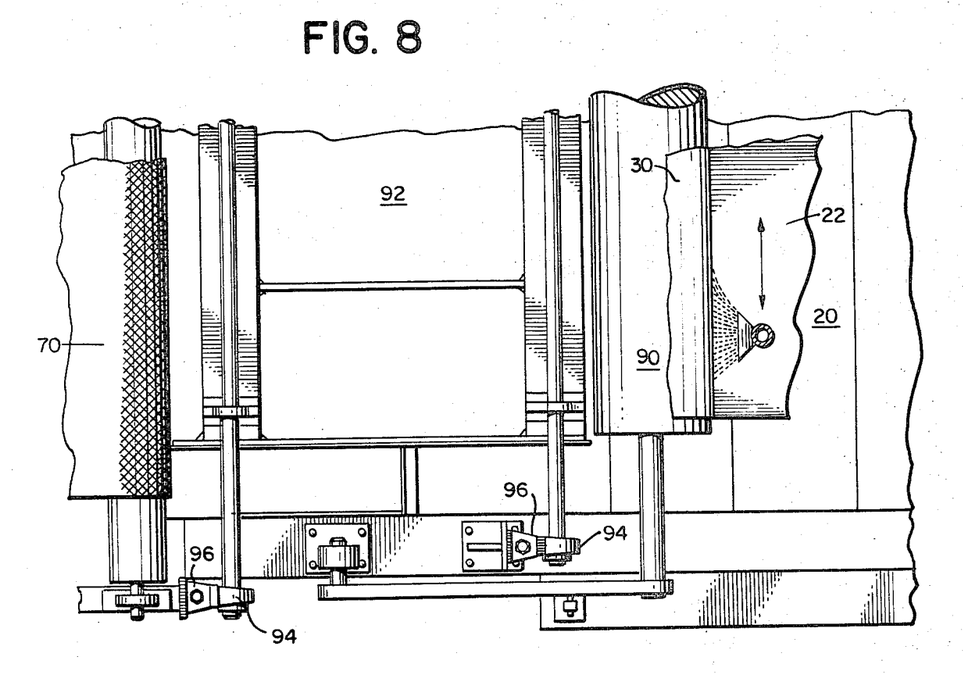
FIG. 8 is a top plan view of the apparatus as seen in FIG. 7.

Referring to those drawings, roller 90 serves here merely as an idler roll for effecting preliminary conjunction of upper web 30 with lower web 22. The final spacing between the webs, that is, the vertically adjustable nipforming member corresponding generally to the nip roll of the previous arrangement, is effected in this instance by an adjustable apron 92 positioned above and extending transversely across the terminal portion of bed 20. Apron 92 is a flat smooth plate which is supported at its leading and trailing ends from vertically adjustable bracket means 94. Brackets 94 are provided with screw jacks 96 which permit changing the spacing of the leading and trailing edges of apron 92 relative to bed 20.

As the advancing webs pass between apron 92 and bed 20, the spacing of the leading and trailing edges of the apron, relative to the bed, determines the nip point at which contact of the upper web 30 with the resin on lower web 22 occurs. Preferably this contact is made to occur as early as possible to effectively wet the surface of the upper web to promote good adhesion in the final product. However the resin mix is still somewhat fluid at this point, undergoing reaction to develop into a rising foam. If the apron is spaced too closely to the bed it will cause excessive interference with the natural rise profile of the foam. Accordingly, the trailing edge of apron 92 is elevated so as to incline it upwardly in the direction of web travel and thus permit expansion of the laminate to occur as the foam develops. By properly elevating the trailing edge of the apron, the incline of the apron can be made to substantially coincide with the natural rise profile of the resin so as not to interfere appreciably with that rise and cause undesired packing, yet still serve in some measure as a restraint or back-up plate against which the rising foam can press the upper web sheet to ensure contact of the web and foam before the latter has set sufficinetly to preclude good bonding to occur.

As in the previously described embodiment, the mounting supports for apron 92 may be variably positioned along bed 20 to alter the position of the apron relative to the entrance to the cure oven; however, as illustrated in FIG. 8, the mounting supports are shown as being fixed in position, which is generally acceptable since the point at which the nip is effected can, within limits at each fixed position of the mounting supports, be variably adjusted longitudinally of the direction of web travel by varying the spacing and inclination of the apron relative to bed 20.

What is claimed is:

1. Apparatus for producing web-faced, foamed-resin core, sandwich structures in continuous lengths comprising in combination:

horizontally disposed conveyor means forming vertically spaced, opposed upper and lower traveling surfaces; an enclosure defining a curing zone through which said conveyor surfaces are advanced; and means for continuously advancing said surfaces in unison longitudinally from an entrance point of said curing zone toward an exit therefrom;

means for feeding facing webs into contact, one each, with said advancing upper and lower traveling surfaces; a substantially planar rigid support for a first of said facing webs to define a plane of travel which extends for a predetermined distance in advance of said curing zone entrance; and means for causing the other of said webs to converge into and continue in closely spaced parallel relation to said planar support, beginning at an intermediate point along said predetermined distance;

a mixing head having a discharge nozzle for laying down a self-foaming resin mix across at least one of the facing webs ahead of the point of web convergence; means supporting said mixing head, and means for shifting said supporting means longitudinally of the direction of conveyor travel to adjustably position the lay-down of resin mix relative to the entrance of said cure zone, means extending crosswise of said planar support and parallel thereto to form a nip therewith through which said facing webs pass, at least one member of the nip-forming means being adjustable toward and away from the other to vary the nip gap, said nip-forming means being positioned intermediate said resin mix lay-down point and entrance to to said cure zone, said one member of said nip-forming means also being independently adjustable to shift the nip longitudinally of the direction of conveyor travel to shift its position relative to the entrance of said cure zone and said resin mix lay-down point.

2. Apparatus as defined in claim 1, wherein said planar support is disposed substantially horizontal.

3. Apparatus as defined in claim 1, wherein said adjustable nip-forming means comprises a roller supported adjacent said rigid planar support, bearings supporting said roller, said bearings and roller being adjustably mounted to vary the nip gap formed between said planar support and roller.

4. Apparatus as defined in claim 3, which further includes incline blocks supported on said planar support at either side of said advancing webs, said roller being supported on said incline blocks and said adjustable means including mechanism for sliding said incline blocks longitudinally of said planar support to vary the gap between said roller and said support.

5. Apparatus as defined in claim 1, wherein said adjustable nip-forming means includes a plate supported above said planar support having leading and trailing edges relative to the direction of web travel, and means for vertically adjusting the spacing of said leading and trailing edges of said plate relative to said planar support.

6. Apparatus as defined in claim 1, which further includes means for reciprocating said mixing head transversely of the direction of web travel, and means automatically changing the rate of traverse in different portions of the traverse cycle.

7. Apparatus as defined in claim 6, wherein said means for reciprocating said mixing head is a hydraulic ram connected between said head and its said supporting means; a source of hydraulic pressure and a supply line connected between said ram and pressure source; and said means automatically changing the traverse rate of said head comprises restrictor valve means in said hydraulic supply line, and trip means on said mixing head support actuated by traverse of said mixing head and operably connected to said restrictor valve means.

* * * * *